United States Patent
Nakashima et al.

(10) Patent No.: US 9,215,459 B2
(45) Date of Patent: Dec. 15, 2015

(54) IMAGE PROCESSING APPARATUS, IMAGE CAPTURING APPARATUS, AND PROGRAM

(71) Applicant: Panasonic Corporation, Osaka (JP)

(72) Inventors: Toshiyuki Nakashima, Hyogo (JP); Takeshi Hamasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 392 days.

(21) Appl. No.: 13/738,439

(22) Filed: Jan. 10, 2013

(65) Prior Publication Data

US 2013/0177080 A1    Jul. 11, 2013

(30) Foreign Application Priority Data

Jan. 11, 2012    (JP) .................. 2012-002739

(51) Int. Cl.
*H04N 7/26* (2006.01)
*H04N 19/51* (2014.01)
*H04N 19/513* (2014.01)

(52) U.S. Cl.
CPC ....... *H04N 19/00703* (2013.01); *H04N 19/521* (2013.01)

(58) Field of Classification Search
CPC .............................................. H04N 19/00703
USPC ...................... 375/240.01, 240.14
IPC ....................................... H04N 7/26
See application file for complete search history.

(56) References Cited

U.S. PATENT DOCUMENTS

2008/0095239 A1*   4/2008   Lim et al. ................. 375/240.16
2010/0033620 A1*   2/2010   Hoshino et al. ............... 348/441

FOREIGN PATENT DOCUMENTS

EP            0 909 092 A2    4/1999
JP            2006-331136 A   12/2006
JP            2010-177739 A    8/2010

OTHER PUBLICATIONS

Co-pending U.S. Appl. No. 13/738,069, filed Jan. 10, 2013.
Co-pending U.S. Appl. No. 13/738,280, filed Jan. 10, 2013.

* cited by examiner

*Primary Examiner* — Jayanti K Patel
*Assistant Examiner* — Yulin Sun
(74) *Attorney, Agent, or Firm* — Renner, Otto, Boisselle & Sklar, LLP

(57) ABSTRACT

An exemplary image processing apparatus generates an interpolation frame to be inserted between two contiguous frames of a moving picture. The image processing apparatus includes: a motion vector calculation section configured to calculate a first motion vector by performing a matching operation between first and second frames, of a first frame, a second frame and a third frame of the moving picture contiguous with one another, and calculate a second motion vector by performing a matching operation between the second and third frames; and an interpolation frame generation section configured to generate an interpolation frame to be inserted between the second frame and the third frame through a process performed based on a magnitude of a difference vector between the first motion vector and the second motion vector.

7 Claims, 8 Drawing Sheets

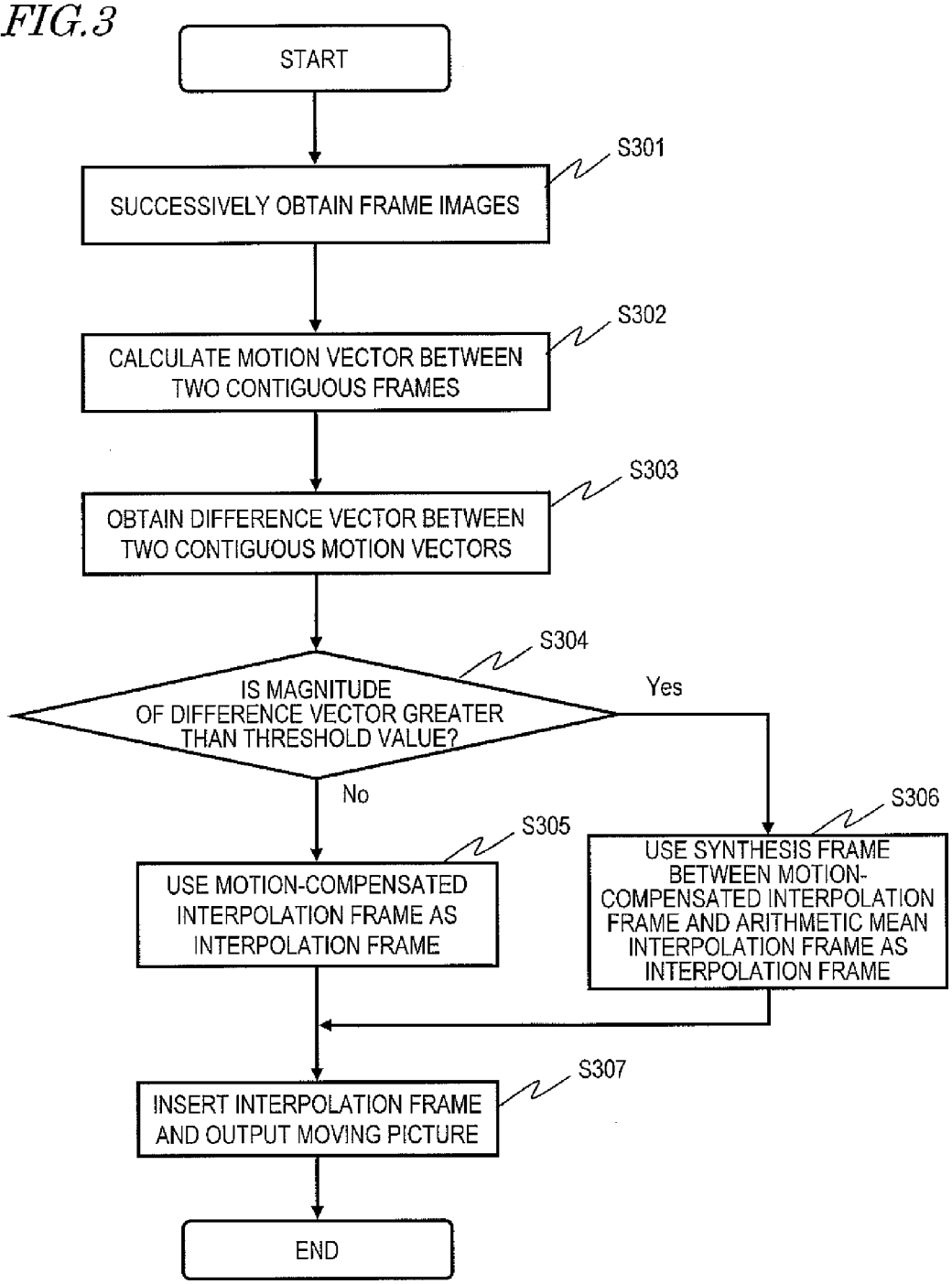

FIG.5
(a) FIRST FRAME
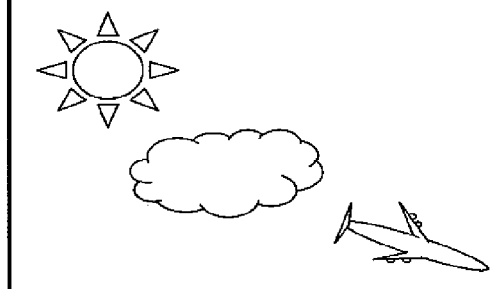
(b) MOTION-COMPENSATED INTERPOLATION FRAME
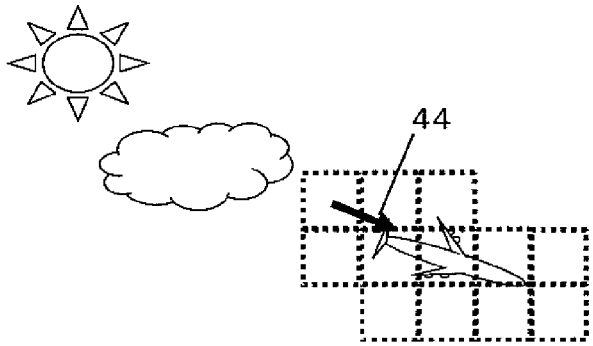
(c) SECOND FRAME
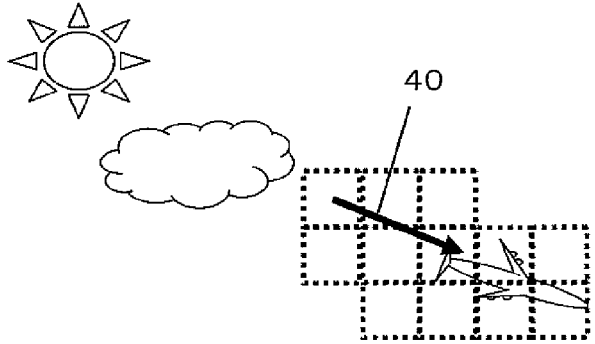

FIG.7
(a) FIRST FRAME
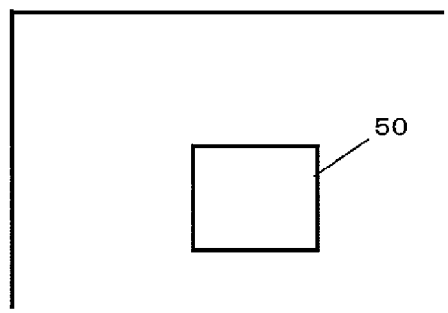
(b) SECOND FRAME
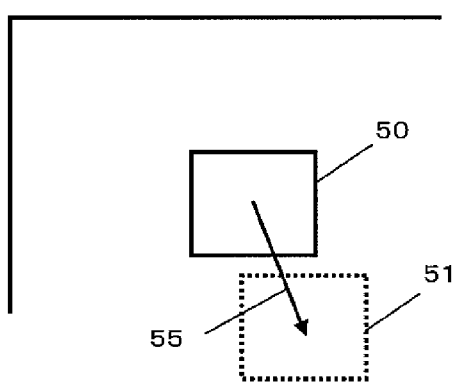
(c) THIRD FRAME
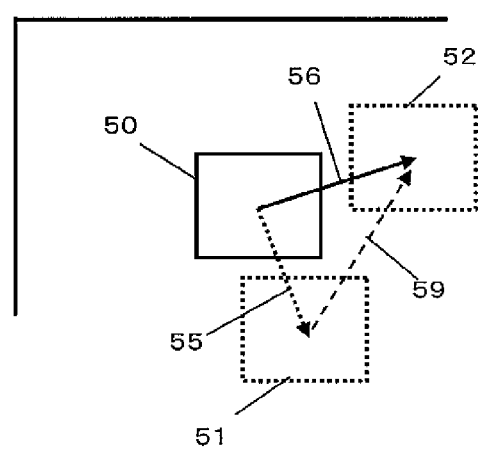

IMAGE PROCESSING APPARATUS, IMAGE CAPTURING APPARATUS, AND PROGRAM

BACKGROUND

1. Technical Field

The present disclosure relates to an image processing technique capable of converting a frame rate of a moving picture obtained through an image capturing operation.

2. Description of the Related Art

Japanese Laid-Open Patent Publication No. 2010-177739 discloses an image processing apparatus. The image processing apparatus generates interpolation frame images to be inserted between frame images. The image processing apparatus of Japanese Laid-Open Patent Publication No. 2010-177739 calculates the search area for a motion vector of an interpolation pixel included in an interpolation frame image based on a change in the pixel value within each frame of a plurality of frame images, and generates an interpolation frame image based on a motion vector estimated in the calculated search area.

SUMMARY

With a conventional technique, where an interpolation frame image is generated using a motion vector, if there is an object whose motion changes abruptly, there is a high possibility that a motion vector is calculated erroneously, and an appropriate interpolation frame may not be obtained.

One non-limiting, and exemplary embodiment of the present disclosure provides a technique to generate a more appropriate interpolation frame even if there is an object whose motion changes abruptly.

In one general aspect, an image processing apparatus disclosed herein generates an interpolation frame to be inserted between two contiguous frames of a moving picture. The image processing apparatus includes: a motion vector calculation section configured to calculate a first motion vector by performing a matching operation between first and second frames, of a first frame, a second frame and a third frame of the moving picture contiguous with one another, and calculate a second motion vector by performing a matching operation between the second and third frames; and an interpolation frame generation section configured to generate an interpolation frame to be inserted between the second frame and the third frame through a process performed based on a magnitude of a difference vector between the first motion vector and the second motion vector.

According to the above aspect, it is possible to generate a more appropriate interpolation frame even if there is an object whose motion changes abruptly.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3 is a flow chart showing an operation performed by the image processing section of the digital video camera according to example Embodiment 1.

FIG. 5 shows diagrams illustrating a process of generating a motion vector and a motion-compensated interpolation frame from first and second contiguous frames, wherein (a) shows an example of a first frame, (b) shows an example of a motion-compensated interpolation frame, and (c) shows an example of a second frame.

FIG. 7 (a) is a diagram showing one macroblock in the first frame, (b) is a diagram showing the corresponding area in the second frame and a motion vector, and (c) is a diagram showing the corresponding area in the third frame and a difference vector.

DETAILED DESCRIPTION

Figure 1:
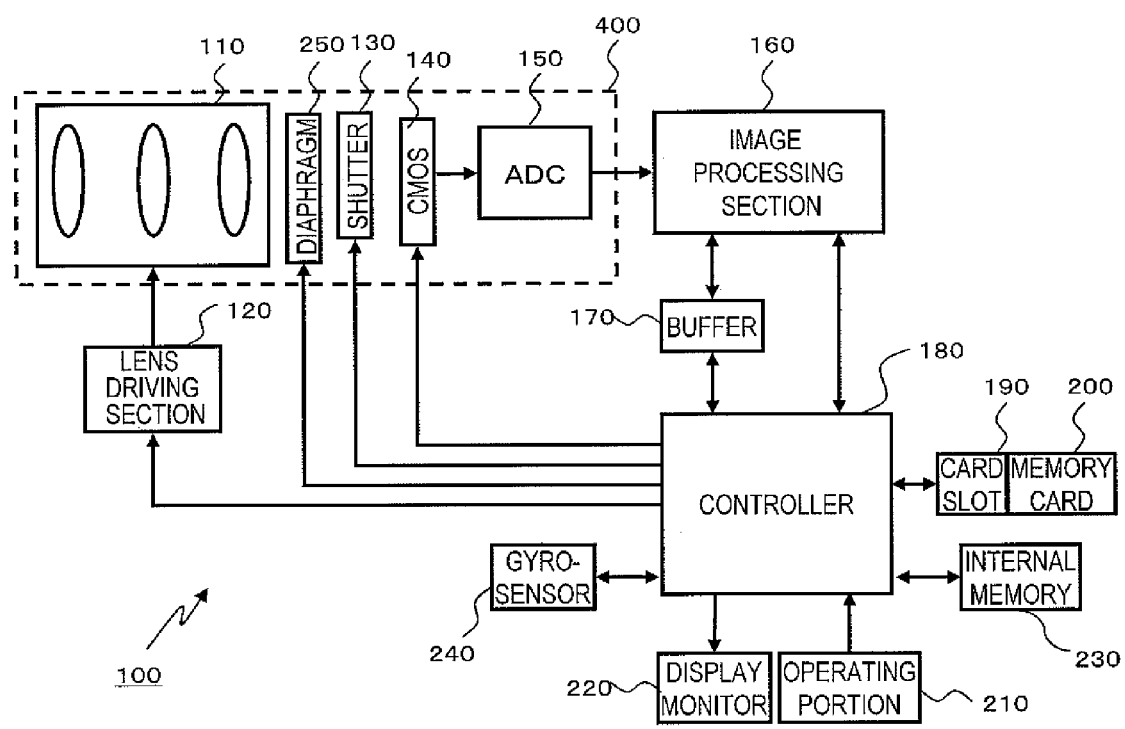
FIG. 1 is a block diagram showing a configuration of a digital video camera according to example Embodiment 1.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand. Note that the present inventors provide the accompanying drawings and the following description in order for a person of ordinary skill in the art to sufficiently understand the present disclosure, and they are not intended to limit the subject matter set forth in the claims.

Embodiment 1

First, Embodiment 1, in which the technique of the present disclosure is applied to a digital video camera, will now be described. In the following description, data representing each of the individual still images of a moving picture will be referred to a "frame image" or simply a "frame". A frame to be inserted between two contiguous frames will be referred to as an "interpolation frame image" or simply an "interpolation frame".

1-1. Outline

A digital video camera (hereinafter also referred to simply as a "camera") of the present embodiment is an image capturing apparatus capable of capturing a moving picture. The digital video camera of the present embodiment is capable of converting a frame rate on-the-fly during the operation of capturing a moving picture, or after the operation, in response to a user instruction, etc. The digital video camera of the present embodiment changes the frame rate by inserting an interpolation frame image between frame images obtained through an image capturing operation. For example, when performing a movie capturing operation at 60 frames per second, the operation can be switched to a movie capturing operation at 120 frame per second by inserting interpolation frame images between frames. The time when the digital video camera switches frame rates from one to another may be when a user gives an instruction to change the frame rate, when information (e.g., brightness information) obtained from an image captured through an image capturing operation (hereinafter also referred to as a "captured image".) is changed, or when a predetermined mode (e.g., a low-speed image capturing mode) is selected.

1-2. Configuration of Digital Video Camera

Now, a configuration of a digital video camera 100 according to the present embodiment will be described with reference to FIG. 1. FIG. 1 is a block diagram showing a configuration of the digital video camera 100. The digital video camera 100 uses a CMOS image sensor 140 to capture an object image formed by an optical system 110 including one or more lenses. The image data generated by a CMOS image sensor 140 is subjected to various processes by an image processing section 160, and stored in a memory card 200.

The optical system 110 has as a group of lenses, including a zoom lens and a focus lens. By moving the zoom lens along the optical axis, it is possible to enlarge or shrink the object image. By moving the focus lens along the optical axis, it is possible to adjust the focus of the object image. Note that while three lenses are shown in FIG. 1 as an example, the number of lenses of the optical system 110 is appropriately determined in accordance with the required functionality.

A lens driving section 120 drives various lenses included in the optical system 110. The lens driving section 120 includes, for example, a zoom motor for driving the zoom lens and a focus motor for driving the focus lens.

A diaphragm 250 adjusts the size of the opening, thereby adjusting the amount of light to pass therethrough, in accordance with the user settings or automatically.

A shutter 130 blocks light from entering the CMOS image sensor 140.

The CMOS image sensor 140 is an image capturing device for generating image data through photoelectric conversion of an object image formed by the optical system 110. The CMOS image sensor 140 performs various operations, such as exposure, transfer, electronic shutter, etc. The CMOS image sensor 140 generates new image data at intervals of a certain amount of time. While the CMOS image sensor 140 is used as an image capturing device in the present embodiment, image capturing apparatuses of other types may also be used, such as a CCD image sensor or an NMOS image sensor.

An A/D converter (ADC) 150 is a circuit, electrically connected to the CMOS image sensor 140, for converting analog image data generated by the CMOS image sensor 140 to digital image data.

In the present embodiment, a plurality of elements including the optical system 110, the diaphragm 250, the shutter 130, the CMOS sensor 140 and the ADC 150 together form an image capturing section 400. The image capturing section 400 generates and outputs digital moving picture data including a plurality of contiguous frames.

The image processing section 160 can be implemented by a digital signal processor (DSP), a microcomputer, or the like, for example. The image processing section 160 is electrically connected to the ADC 150, and performs various processes on the image data generated by the CMOS image sensor 140, to generate image data to be displayed on a display monitor 220, and image data to be stored in the memory card 200. The image processing section 160 performs various processes, such as gamma correction, white balance correction, scar correction, etc., for example, on the image data generated by the CMOS image sensor 140. The image processing section 160 compresses image data generated by the CMOS image sensor 140 in accordance with a compression scheme, etc., in conformity with the H.264 standard, the MPEG2 standard, or the like.

The image processing section 160 can further calculate the motion vector based on the image data (frame image) generated by the CMOS image sensor 140. Then, the image processing section 160 can generate an interpolation frame image by motion compensation based on the calculated motion vector and the frame image associated with the motion vector. Alternatively, the image processing section 160 can generate an interpolation frame through averaging by adding together a plurality of correlated frame images at a predetermined ratio without using motion compensation. The details of the process of generating these interpolation frames will be described later.

A controller 180 is a control means for controlling the entire digital video camera. The controller 180 can be implemented by a semiconductor device, or the like. The controller 180 may be implemented only by hardware, or may be implemented by a combination of hardware and software. The controller 180 can be implemented by, for example, a microcomputer, or the like. Alternatively, it may be implemented by a single semiconductor chip, together with the image processing section 160, etc. As shown in FIG. 1, the controller 180 is electrically connected to the image processing section 160 and various other sections, and sends control signals thereto.

Note that the image processing section 160 and the controller 180 may be implemented by separate semiconductor chips or by a single semiconductor chip. There is no limitation on these physical configurations as long as processes to be described later can be realized.

A buffer 170 is electrically connected the image processing section 160 and the controller 180, and serves as a work memory thereof. The buffer 170 can be implemented by, for example, a DRAM, a ferroelectric memory, or the like.

A card slot 190 is capable of receiving the memory card 200, and can be mechanically and electrically connected to the memory card 200. The memory card 200 includes therein a flash memory, a ferroelectric memory, or the like, and can store data such as an image file generated by the image processing section 160.

An internal memory 230 is implemented by a flash memory, a ferroelectric memory, or the like. The internal memory 230 stores a control program, etc., for controlling the entire digital video camera 100. The control program is executed by the controller 180.

A operating portion 210 generally refers to a user interface via which user operations are accepted. The operating portion 210 includes, for example, a cross-shaped key, an OK button, and the like, via which user operations are accepted.

The display monitor 220 is capable of displaying an image (through image) represented by image data generated by the CMOS image sensor 140, and an image represented by image data read out from the memory card 200. The display monitor 220 can also display various menu screens, etc., used for changing various settings of the digital video camera 100.

A gyrosensor 240 is a motion detector for detecting a shake in the yawing direction and a movement in the pitching direction based on the angular change over unit time, i.e., the angular velocity, of the digital video camera 100. The gyrosensor 240 outputs a gyro signal, representing the detected amount of movement, to the controller 180.

Note that the configuration described above is merely an example, and the digital video camera 100 may have any configuration as long as the image processing section 160 can perform an operation to be described below.

1-3. Operation

Now, an operation of the digital video camera 100 according to the present embodiment will be described. The digital video camera 100 generates an interpolation frame to be inserted between two frames contiguous in time with each other. When generating an interpolation frame, the image processing section 160 of the digital video camera 100 calculates a first motion vector by performing a matching operation between first and second frames, of a first frame, a second frame and a third frame of a moving picture contiguous with one another, and calculates a second motion vector by performing a matching operation between the second and third frames. Then, an interpolation frame to be inserted between the second frame and the third frame is generated through a process performed based on the magnitude of the difference vector between the first motion vector and the second motion vector.

Figure 2:
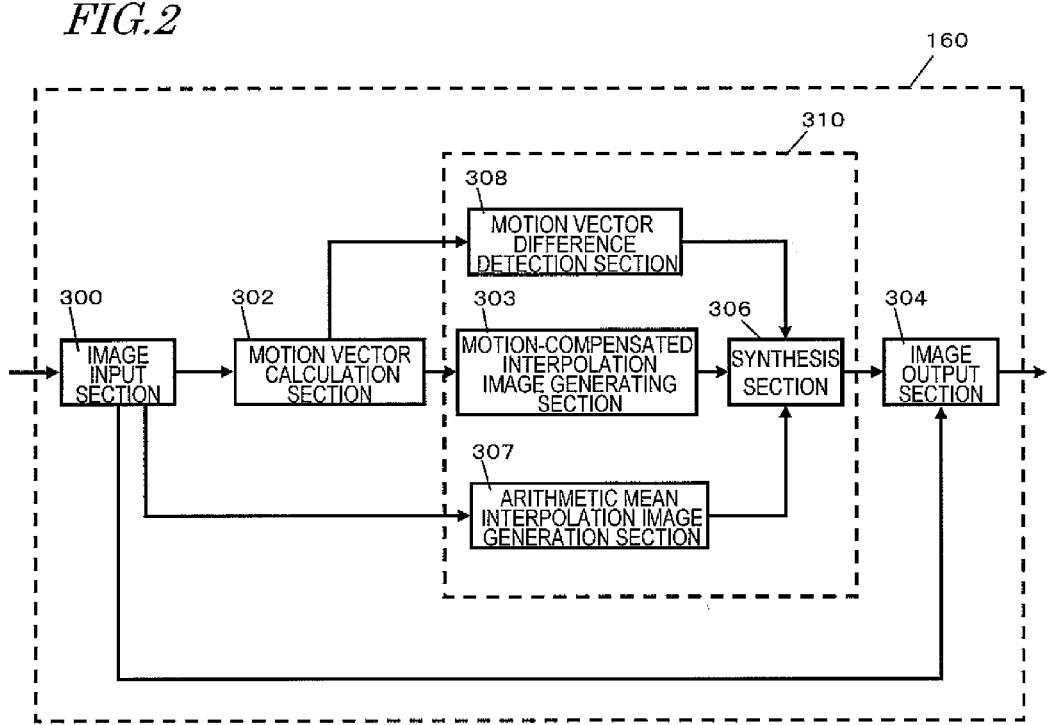
FIG. 2 is a block diagram showing a configuration of an image processing section of the digital video camera according to example Embodiment 1.

FIG. 2 is a block diagram showing a configuration of the image processing section 160 for realizing the operation described above of the digital video camera according to the present embodiment. The image processing section 160 includes the image input section 300 for receiving moving picture data output from the image capturing section 400, the motion vector calculation section 302 for calculating a motion vector between two contiguous frames, the interpolation frame generation section 310 for generating an interpolation frame to be inserted between two frames, and the image output section 304 for outputting the moving picture data where interpolation frames have been inserted to the outside. The interpolation frame generation section 310 includes a motion-compensated interpolation image generating section 303 for generating an interpolation frame based on the motion vector, an arithmetic mean interpolation image generation section 307 for generating an interpolation frame obtained by obtaining the arithmetic mean between two contiguous frames, a motion vector difference detection section 308 for detecting the difference between motion vectors, and a synthesis section 306 for generating a correction frame based on the magnitude of the motion vector difference.

These functional sections of the image processing section 160 may be implemented by individual circuit blocks that are physically separated from one another and electrically connected to one another. Alternatively, the functional sections may be implemented by a processor provided in the image processing section 160 executing programs defining the processes of the functional sections. The connection between these functional sections is not limited to the configuration of FIG. 2, but may be configured so that signals are exchanged via buses that are not shown or a recording medium. Each functional section may be further divided into a plurality of elements, or a plurality of functional sections may be integrated into a single element.

The image input section 300 includes terminals for receiving contiguous frames from outside and sending data to the motion vector calculation section 302, the arithmetic mean interpolation image generation section 307 and the image output section 304, and circuits around the terminals. The image input section 300 outputs the frames to the motion vector calculation section 302, the arithmetic mean interpolation image generation section 307, and the image output section 304.

The motion vector calculation section 302 calculates a motion vector by performing a block matching operation between two contiguous frames. The motion vector calculation section 302 outputs the calculated motion vector and the frames to the motion-compensated interpolation image generating section 303, and outputs the calculated motion vector to the motion vector difference detection section 308.

The motion-compensated interpolation image generating section 303 generates, from the first and second frames and the motion vector received, a frame (motion-compensated interpolation frame) representing the intermediate state between the first and second frames, and outputs the generated frame to the synthesis section 306. The details of the operation of the motion-compensated interpolation image generating section 303 will be described later.

The arithmetic mean interpolation image generation section 307 generates a frame (arithmetic mean interpolation frame) representing the arithmetic mean between the two contiguous frames received from the image input section 300 for each pixel, and outputs the generated frame to the synthesis section 306. The details of the operation of the arithmetic mean interpolation image generation section 307 will also be described later.

Through a process to be described later, the motion vector difference detection section 308 obtains the difference vector between two motion vector contiguous in time with each other, and outputs information representing the magnitude of the difference vector to the synthesis section 306. The synthesis section 306 generates and outputs an appropriate interpolation frame to the image output section 304 based on the frames received from the motion-compensated interpolation image generating section 303 and the arithmetic mean interpolation image generation section 307, and information representing the magnitude of the difference vector received from the motion vector difference detection section 308. The image output section 304 inserts the interpolation frame output from the synthesis section 306 between the first and second frames contiguous with one another, and outputs the resultant data to the outside.

The operation of the digital video camera 100 during the image capturing operation will now be described.

When the power is turned ON, a controller 180 supplies power to various sections of the digital video camera 100. The digital video camera 100 can be switched between the shooting mode and the playback mode by a user operation, or the like. After power is supplied, if the digital video camera 100 has been set in the shooting mode, the controller 180 initializes the optical system 110, the CMOS image sensor 140, etc., to set up the camera ready for shooting. Upon completing the setup operation for shooting, the controller 180 controls the CMOS image sensor 140 to capture an image, instructs the image processing section 160 so as to convert the image signal, which has been converted by an A/D converter 150 to a digital signal, to a signal that can be displayed as the through image, and performs a control so that the generated through image is displayed on the display monitor 220. By looking at the through image displayed on the display monitor 220, the user can check the angle of view, the object, etc., during the image capturing operation. The user can depress a movie recording button (a part of the operating portion 210) at any point in time to instruct the controller 180 to record a moving picture. Upon receiving an instruction to record a moving picture, the controller 180 processes the image being captured by the CMOS image sensor 140 as a moving picture in a format in conformity with a predetermined standard, and starts recording the processed moving picture data on the memory card 200. On the other hand, the user can depress the movie recording button at any point in time during the movie recording operation to instruct the controller 180 to end the moving picture recording operation.

With the digital video camera 100, it is possible to change the frame rate of the moving picture captured during the movie recording operation. The time when the frame rate is changed may be, for example, when a user gives an instruction, when information (e.g., brightness information) obtained from the captured image is changed, or when a predetermined mode (e.g., a low-speed image capturing mode) is selected. Alternatively, a change of the frame rate may be programmed in advance.

When the frame rate needs to be changed, the image processing section 160 generates an interpolation frame image to be inserted between frame images. The process of generating the interpolation frame by the image processing section 160 will now be described.

FIG. 3 is a flow chart showing the interpolation frame generating process performed by the image processing section 160. First, in step S301, the image input section 300 successively obtains frame images output from the image capturing section 400 (S301). The frame images obtained by the image input section 300 are sent to the motion vector calculation section 302, the arithmetic mean interpolation image generation section 307, and the image output section 304.

Then, in step S302, the motion vector calculation section 302 calculates a motion vector between two contiguous frames received from the image input section 300. The motion vector is calculated through a block matching operation, to described later, performed between the two contiguous frames. Information representing the calculated motion vector is sent to the motion-compensated interpolation image generating section 303 and the motion vector difference detection section 308.

Then, in step S303, the motion vector difference detection section 308 obtains the motion vector difference from a plurality of motion vectors received successively. Herein, "difference" means a difference vector between two contiguous motion vectors. Then, information representing the magnitude of the difference vector is output to the synthesis section 306.

Then, in step S304, the synthesis section 306 determines whether the magnitude of the difference vector greater than a predetermined threshold value. If the magnitude of the difference vector is less than or equal to the threshold value, the motion-compensated interpolation image generated by the motion-compensated interpolation image generating section 303 is output to the image output section 304 as the interpolation frame in step S305. On the other hand, if the magnitude of the difference vector is greater than the threshold value, a synthetic frame between the motion-compensated interpolation frame and an arithmetic mean interpolation frame generated by the arithmetic mean interpolation image generation section 307 is output to the image output section 304 as the interpolation frame in step S306. Then, in step S307, the image output section 304 inserts the interpolation frame received from the synthesis section 306 between two corresponding frames, and outputs the interpolated moving picture.

Through the process described above, there is generated a moving picture having a higher frame rate with interpolation frames inserted between two contiguous frames. Now, the operations of the motion vector calculation section 302, the motion-compensated interpolation image generating section 303, the arithmetic mean interpolation image generation section 307, the motion vector difference detection section 308, and the synthesis section 306 will be described in greater detail.

The motion vector calculation section 302 obtains a plurality of frames contiguous in time with each other from the image input section 300. The motion vector calculation section 302 calculates a motion vector by performing a block matching operation between two frames contiguous in time with each other. Block matching is a method of dividing one of two frames to be compared with each other into a plurality of macroblocks, and using each of the macroblocks as the template macroblock to find a matching position in a predetermined search range of the other frame at which the similarity to the template macroblock is highest (the predetermined search range is centered about the position corresponding to the template macroblock). Thus, since it is possible, for each macroblock in one of the frames, to identify the corresponding position in the other frame, it is possible to obtain a motion vector for each macroblock.

The motion vector calculation section 302 calculates a motion vector for each macroblock including 16 pixels×16 pixels, for example. Specifically, the difference (e.g., SAD: Sum of Absolute Difference) is successively calculated by comparing a macroblock in one of two frames contiguous in time with each other with another block of 16 pixels×16 pixels obtained by shifting the macroblock in the horizontal direction and in the vertical direction, within a predetermined search range, from the pixel position in the other frame corresponding to this macroblock. Another evaluation function, such as SSD (Sum of Absolute Difference), may be used instead of SAD. The motion vector calculation section 302 calculates the difference while gradually shifting the pixels. Then, the distance and the direction (the horizontal component and the vertical component) from the pixel corresponding to the center position of the macroblock being processed to the position of the pixel at which the difference takes the minimum. Through such a process, the motion vector calculation section 302 calculates the motion vector.

Where SAD is used as the evaluation function, the motion vector (dx(x,y),dy(x,y)) at the coordinate position (x,y) on the image is determined by obtaining dx and dy that minimize the evaluation function P1(x,y,dx,dy) represented by Expression 1 below. Herein, the size of the macroblock, calculated in the number of pixels, in the horizontal direction (the x direction) of the image and that in the vertical direction (the y direction) are denoted as Bx and By, respectively. Of the two frames to be compared with each other, the pixel value (the brightness value or the value of a particular color component) of the preceding frame is denoted as L1, and that of the following frame as L2.

(Expression 1)

$$P1(x, y, dx, dy) = \sum_{i=-Bx/2}^{Bx/2} \sum_{j=-By/2}^{By/2} |L1(x+i, y+j) - L2(x+dx+i, y+dy+j)|$$

On the other hand, where SSD is used as the evaluation function, the motion vector (dx(x,y),dy(x,y)) at the coordinate position (x,y) on the image is determined by obtaining dx and dy that minimize the evaluation function P2(x,y,dx,dy) represented by Expression 2 below.

$$P2(x, y, dx, dy) = \sum_{i=-Bx/2}^{Bx/2} \sum_{j=-By/2}^{By/2} (L1(x+i, y+j) - L2(x+dx+i, y+dy+j))^2 \quad \text{(Expression 2)}$$

By using an evaluation function represented by Expression 1 or 2, the motion vector calculation section 302 can calculate the motion vector (dx(x,y),dy(x,y)) for each macroblock.

Now, in a normal image capturing operation, it is expected that there are only a few cases where there is an abruptly-moving object (an object whose motion vector changes abruptly). Therefore, in order to increase the efficiency of the operation of obtaining the motion vector, the motion vector calculation section 302 searches for a match more finely in areas around the area corresponding to the previously-calculated motion vector, and more coarsely in areas far away from the area corresponding to the previously-calculated motion vector. Herein, "being far away" means being remote in terms of the coordinate position on the image. Cases where coordinate positions on the image are remote from each other include cases where the motion vector and the preceding motion vector are of different directions, as well as cases where they share the same direction but have different magnitudes.

Figure 4A:
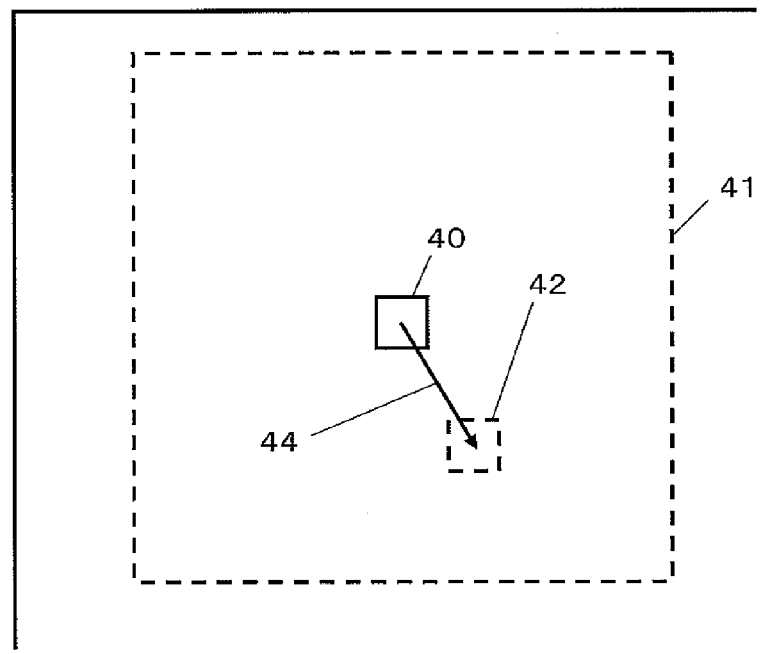
FIG. 4A is a diagram showing an example of a motion vector calculated for one macroblock.
Figure 4B:
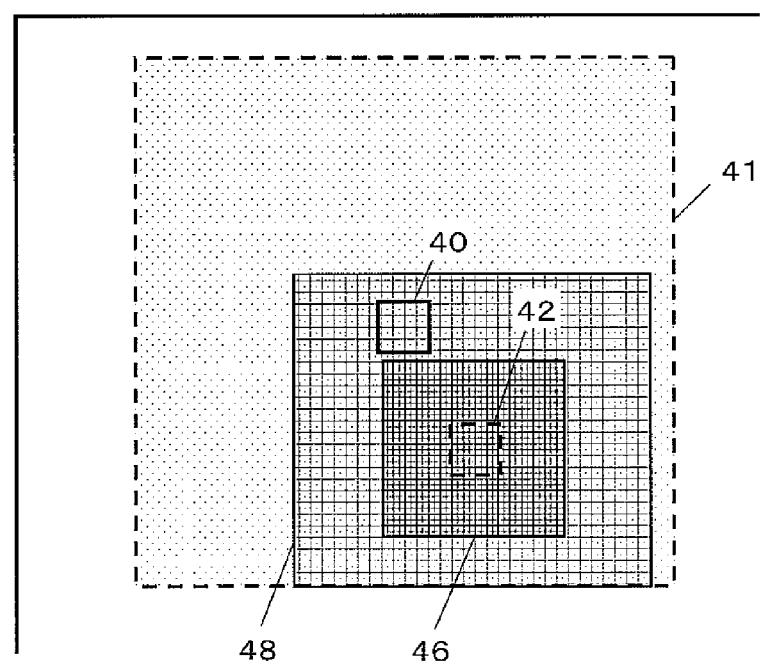
FIG. 4B is a diagram showing an example where a motion vector is calculated by searching for a match more finely in areas closer to the area corresponding to the preceding motion vector, and more coarsely in areas farther away from the area.

FIGS. 4A and 4B are diagrams illustrating an example of a process of calculating the motion vector based on such a point of view. First, consider one macroblock 40 in the frame shown in FIG. 4A. Assume that as a result of searching through the inside of a search range 41 using, as the template, the partial image at the position of the macroblock 40 in the preceding frame, it has been determined that the partial image of an area 42 is closest to the template. In such a case, a vector 44 extending from the center coordinate position of the block 40 to the center coordinate position of the area 42 is calculated as the motion vector at the position of the macroblock 40.

Then, the motion vector calculation section 302 further obtains a motion vector between the frame and the next frame. As described above, the motion vector calculation section 302 uses, as the template, the partial image at the position of the macroblock 40 in the preceding frame, and searches through the inside of the search range 41. This process searches for a match more finely in areas around the area 42 corresponding to the previously-obtained motion vector 44, and more coarsely farther away from the area 42. In other words, the process searches for a match more finely in areas within the first distance from the point in the block represented by the previous motion vector 44 (the center of the area 42) than in areas within the second distance which is longer than the first distance. For example, as shown in FIG. 4B, the process searches for a match while shifting the range of search by one pixel at a time in a first area 46 around the area 42, searches for a match while shifting the range of search by two pixels at a time outside the first area 46 but inside a second area 48, and searches for a match while shifting the range of search by four pixels at a time outside the second area 48 but inside the search range 41. With such a control, it is possible to increase the efficiency of the operation of obtaining the motion vector, thereby increasing the speed of the process as a whole. Note that while three levels of fineness are used in the example shown in FIG. 4B, two or four or more levels of fineness may be used.

The motion vector calculation section 302 sends, to the motion-compensated interpolation image generating section 303, a plurality of frame images contiguous in time with each other obtained from an image input section 330 and the motion vector calculated for each of the macroblocks of the frame being processed. The motion vector calculation section 302 also sends the motion vector calculated for each of the macroblocks to the motion vector difference detection section 308.

The motion-compensated interpolation image generating section 303 shifts an image portion represented by the macroblock which was being processed when calculating a motion vector from one of the frame images contiguous in time with each other to an intermediate position that is dictated by the motion vector. That is, where the motion vector of the macroblock is represented by (dx,dy), the image portion represented by the macroblock is shifted by (dx/2,dy/2). Hereinafter, this process will be referred to as the "motion-compensated interpolation". By similarly performing motion-compensated interpolation for the macroblocks of the frame, the motion-compensated interpolation image generating section 303 can generate an interpolation frame image (motion-compensated interpolation frame) to be inserted between frame images contiguous in time with each other. The motion-compensated interpolation image generating section 303 sends the generated motion-compensated interpolation frame image to the synthesis section 306. Note that the motion-compensated interpolation frame image does not always have to be an intermediate frame, as long as it is a frame representing a transitional state between the two contiguous frames generated based on the motion vector. For example, where two or more interpolation frames are inserted between two contiguous frames, a motion-compensated interpolation frame image represents a state that is closer to either one of the frames, rather than an intermediate state therebetween.

FIG. 5 shows diagrams illustrating the concept of the process performed by the motion-compensated interpolation image generating section 303. FIGS. 5(a) to 5(c) show examples of a first frame, a motion-compensated interpolation frame, and a second frame, respectively. FIGS. 5(b) and 5(c) show macroblocks (dotted line) in which a motion has been detected between the first and second frames. In this example, no motion has been detected in macroblocks other than those represented by dotted line. The motion vector calculation section 302 calculates a motion vector 40 for some of the macroblocks represented by dotted line in FIG. 5(c). Note that FIG. 5(c) only shows a motion vector 40 corresponding to one, upper left, macroblock. The motion-compensated interpolation image generating section 303 moves each macroblock in which a motion has been detected from the position thereof in the first frame by the distance of a vector 44 that is half the length of the corresponding motion vector 40, as shown in FIG. 5(b). Thus, a motion-compensated interpolation frame is generated as shown in FIG. 5(b).

On the other hand, the arithmetic mean interpolation image generation section 307 obtains frames contiguous in time with each other from the image input section 300. Then, the arithmetic mean interpolation image generation section 307 calculates the arithmetic mean pixel by pixel for the two frames contiguous in time with each other, between which an interpolation frame is to be sandwiched. Thus, the arithmetic mean interpolation image generation section 307 generates the arithmetic mean interpolation frame image. The arithmetic mean interpolation image generation section 307 sends the generated arithmetic mean interpolation frame image to the synthesis section 306.

Figure 6:
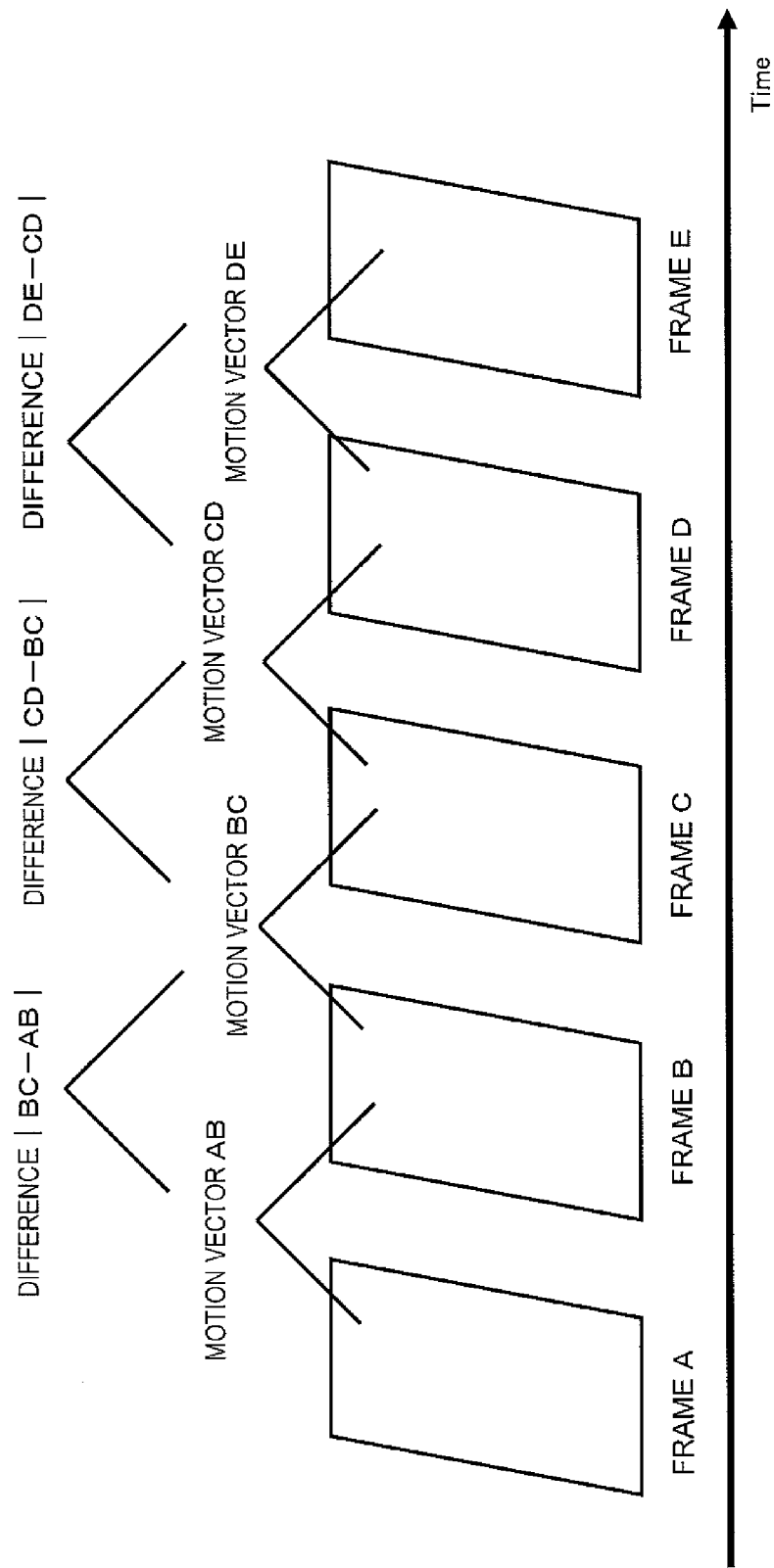
FIG. 6 is a diagram illustrating the difference between motion vectors calculated by the digital video camera according to example Embodiment 1.

The motion vector difference detection section 308 successively detects differences between motion vectors obtained from the motion vector calculation section 302. FIG. 6 is a diagram illustrating the difference between motion vectors contiguous in time with each other in particular macroblock calculated by the digital video camera 100. In FIG. 6, frames A to E denote original frame images contiguous in time with one another. In the example shown in FIG. 6, the motion vector calculation section 302 calculates a motion vector AB based on the frame A and the frame B, and sends the motion vector AB to the motion vector difference detection section 308. Then, the motion vector calculation section 302 sends a motion vector BC calculated based on the frame B and the frame C to the motion vector difference detection section 308. Similarly, the motion vector calculation section 302 successively sends a motion vector CD and a motion vector DE to the motion vector difference detection section 308. While the motion vector is calculated for each of the macroblocks in the present embodiment, FIG. 6 only shows motion vectors for one macroblock for the sake of simplicity.

The motion vector difference detection section 308 detects the motion vector differences successively sent from the motion vector calculation section 302. In the example shown in FIG. 6, the motion vector difference detection section 308 detects the magnitude of the difference vector (hereinafter referred to also as the "difference value") |BC−AB| between the motion vector AB and the motion vector BC. Then, the motion vector difference detection section 308 detects the difference value |CD−BC| between the motion vector BC and the motion vector CD. Similarly, the difference value |DE−CD| between the motion vector CD and the motion vector DE is detected. The motion vector difference detection section 308 successively sends the detected motion vector difference values to the synthesis section 306. Note that while the difference vector is also calculated for each of the macroblocks in the frame, FIG. 6 only shows the difference vector for one macroblock.

In step S304, the synthesis section 306 compares the magnitude of the difference vector (difference value) of the difference vector between two contiguous motion vectors notified from the motion vector difference detection section 308, with a predetermined reference value (threshold value). The synthesis section 306 generates an interpolation frame image to be inserted between frame images based on the comparison result. Herein, the motion-compensated interpolation frame is denoted as F1 and the arithmetic mean interpolation frame as F2, with the coefficients thereof being $\alpha$ ($0<\alpha<1$) and $\beta$ ($=1-\alpha$), respectively. The interpolation frame F to be eventually adopted is generated in accordance with the following expression.

$$F = \alpha F1 - \beta F2 \quad \text{(Expression 3)}$$

where the calculation of Expression 3 is performed for each pixel.

If the motion vector difference value is less than or equal to the predetermined reference value (threshold value), it is believed that there is only a small possibility that there is an object whose motion changes abruptly. As shown in FIG. 4B, the motion vector calculation section 302 calculates the next motion vector by searching for a match finely in areas around the area corresponding to the motion vector which has been calculated between the preceding two frames. Therefore, the motion vector difference value being small means that the motion vector has been calculated with a high precision. Therefore, if the motion vector difference value is less than or equal to the threshold value, the synthesis section 306 employs the motion-compensated interpolation frame image as the interpolation frame image to be inserted between frame images because there is only a small possibility of an erroneous detection of a motion vector due to the presence of an object whose motion changes abruptly.

On the other hand, if the motion vector difference value is greater than the predetermined reference value (threshold value), it is believed that there is a high possibility that there is an object whose motion changes abruptly. As shown in FIG. 4B, the motion vector calculation section 302 calculates the next motion vector by searching for a match finely in areas around the area corresponding to the motion vector calculated between the preceding two frames, and searching for a match coarsely in areas farther away. Therefore, the motion vector difference value being large means that the precision of the calculated motion vector is not high. Therefore, if the motion vector difference value is greater than the threshold value, the synthesis section 306 increases the proportion of the arithmetic mean interpolation frame image, which is not influenced by an erroneous detection of a motion vector, rather than the motion-compensated interpolation frame image which is generated based on the low-precision motion vector, because there is a high possibility of an erroneous detection of a motion vector due to the presence of an object whose motion changes abruptly.

FIG. 7 shows an example of the motion vector difference in a macroblock. FIGS. 7(a) to 7(c) show a first frame, a second frame and a third frame contiguous with one another. Herein, assume a case where the portion of the object located at the position of the macroblock 50 in the first frame shown in FIG. 7(a) moves to the position of an area 51 in the second frame shown in FIG. 7(b). Then, a vector 55 extending between the center of the macroblock 50 in the second frame and the center of the area 51 is calculated as the motion vector at this position between the first and second frames.

Assume that the portion of the object located at the position of the macroblock 50 in the second frame shown in FIG. 7(b) moves to the position of an area 52 in the third frame shown in FIG. 7(c). Then, a vector 56 extending between the center of the macroblock 50 and the center of the area 52 is calculated as the motion vector at this position between the second and third frames.

Now, consider a difference vector 59 between the motion vector 55 and the motion vector 56 shown in FIG. 7(c). The difference vector 59 is a vector extending between the center of the block 51 and the center of the block 52, and represents the change between these two motion vectors. The larger the change in the motion of the object at the position of the macroblock 50, the larger the magnitude (absolute value) of the difference vector 59 is.

The difference vector 59 being large means that the area 52 is significantly remote from the area 51. As described above, the block matching operation searches for a match more finely in areas around the area 51 corresponding to the preceding motion vector 55, and more coarsely in areas farther away from the area 51. Therefore, the difference vector 59 being large means that the motion vector 56 is a vector obtained by coarse searching. That is, it can be said that the larger the difference vector 59, the lower the precision of the motion vector 56 is.

An interpolation frame generated based on the low-precision motion vector 56 is likely to be a frame that is deviated from the interpolation frame which is supposed to be generated. Thus, if the magnitude of the difference vector 59 is greater than the predetermined threshold value, the interpolation frame generation section 310 of the present embodiment generates, as the interpolation frame, a frame that is less dependent on the motion vector 56.

Figure 8:
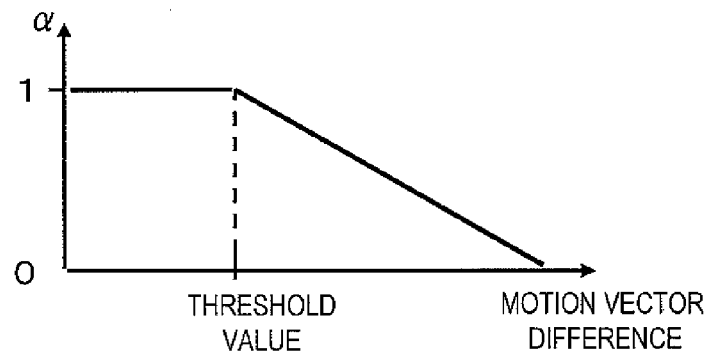
FIG. 8 is a graph showing a transition of the interpolation frame synthesis ratio relative to the motion vector difference of the digital video camera according to example Embodiment 1.

FIG. 8 is a graph illustrating the ratio of synthesis of the interpolation frame corresponding to the motion vector difference. As shown in FIG. 8, until the motion vector difference value exceeds the predetermined reference value (threshold value), there is only a small possibility of an erroneous detection of a motion vector, and a motion-compensated interpolation frame image, which has a higher image quality, is employed as the image to be inserted between frame images. As the motion vector difference value exceeds the predetermined reference value, the possibility of an erroneous detection of a motion vector increases, and therefore the synthesis ratio α of the motion-compensated interpolation frame image is gradually reduced. Meanwhile, the ratio β(=1−α) of the arithmetic mean interpolation frame image, which is not influenced by an erroneous detection of a motion vector, is increased. Thus, even if the image of the frame obtained by an image capturing operation contains an object whose motion changes abruptly, it is possible to more appropriately produce the interpolation frame.

The predetermined threshold value of the present embodiment may be set to an appropriate value depending on the specifications required of the digital video camera 100. For example, in the example where the precision of the block matching operation is changed stepwise based on the distance from the area corresponding to the preceding motion vector as shown in FIG. 4B, the distance from the center of the area 42 to the circumference of the first area 46, or the distance from the center of the area 42 to the circumference of the second area 48 may be used as the threshold value.

The synthesis section 306 sends the generated interpolation frame image to the image output section 304. The image output section 304 places and inserts the generated interpolation frame image between the corresponding two frame images contiguous with each other. Thus, the image processing section 160 can output a moving picture whose frame rate has been changed.

1-4. Advantageous Effects, Etc.

As described above, in the present embodiment, the interpolation frame image to be inserted between two contiguous frame images is generated based on the magnitude of the difference vector between two contiguous motion vectors. Thus, it is possible to generate a more appropriate interpolation frame image taking into consideration the possibility of an erroneous detection of a motion vector due to a motion of an object. Therefore, even if the frame rate is changed to a higher rate, it is possible to display a moving picture of a higher image quality on the display monitor.

If the magnitude of the difference vector is less than or equal to the predetermined threshold value, the interpolation frame generation section 310 generates, as the interpolation frame, a frame (motion-compensated interpolation frame) representing the transitional state between the first and second frames dictated based on the motion vector, and otherwise generates, as the interpolation frame, a frame (synthetic frame or arithmetic mean interpolation frame) that is less dependent on the motion vector than a frame representing the transitional state. Therefore, where there is a high possibility of an erroneous detection of a motion vector, it is possible to avoid generation of a moving picture of a low image quality.

If the magnitude of the difference vector is greater than the threshold value described above, the interpolation frame generation section 310 generates, as the interpolation frame, a frame that is obtained through a process including an arithmetic mean between the first and second frames. Thus, where there is a high possibility of an erroneous detection of a motion vector, it is possible to avoid generation of an inappropriate interpolation frame.

More specifically, if the difference vector is greater than the threshold value described above, the interpolation frame generation section 310 generates, as the interpolation frame, a synthetic frame between a motion-compensated interpolation frame and an arithmetic mean interpolation frame. Moreover, the synthesis ratio between the motion-compensated interpolation frame and the arithmetic mean interpolation frame is changed based on the magnitude of the difference vector. Therefore, it is possible to avoid generation of an unnatural moving picture containing abrupt changes in the content of the interpolation frame when the threshold value is passed, and it is possible to generate a more natural interpolation frame.

Moreover, the motion vector calculation section 302 divides each of the first and second frames contiguous with each other into a plurality of portions (e.g., macroblocks), and performs a matching operation between the first and second frames for each of the divided portions to calculate the motion vector for the portion. The interpolation frame generation section 310 generates the interpolation frame based on the motion vector calculated for each of these portions. Thus, it is possible to realize an interpolation process that reflects the motion of an object for each portion of the frame, and it is possible to generate a more appropriate interpolation frame.

Other Embodiments

Embodiment 1 has been described above as an example of the technique disclosed in the present application. However, the technique of this disclosure is not limited thereto, but is also applicable to other embodiments in which changes, replacements, additions, omissions, etc., are made as necessary. Different ones of the elements described in Embodiment 1 above may be combined together to obtain a new embodiment. In view to this, other embodiments are illustrated hereinbelow.

The synthesis section 306 sets α=1 when the magnitude of the difference vector is less than or equal to a predetermined threshold value, and linearly decreases α with respect to the magnitude of the difference vector when the threshold value is passed, as shown in FIG. 8, in the embodiment above, but the present disclosure is not limited thereto. The decrease of α with respect to the magnitude of the difference vector may be along a curve.

Figure 9:
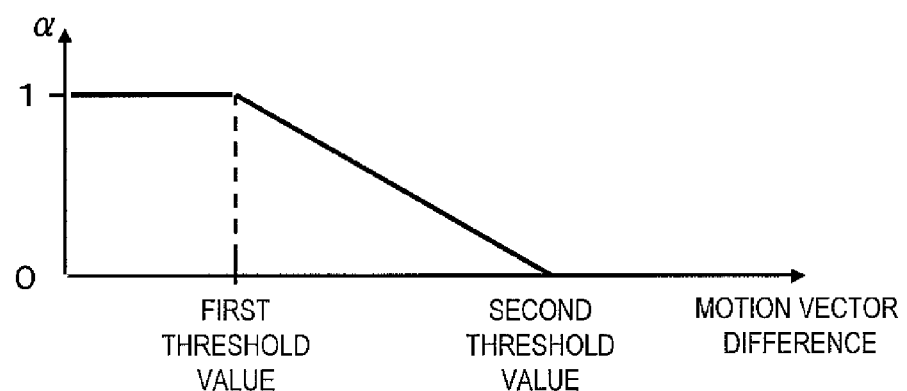
FIG. 9 is a graph showing another example of a transition of the interpolation frame synthesis ratio relative to the motion vector difference.

While one threshold value is set in the embodiment above, two or more threshold values may be set. For example, the synthesis section 306 may set α=1 when the magnitude of the difference vector is less than or equal to the first threshold value, set α=0 when it is greater than or equal to the second threshold value, and set α to a value between 0 to 1 when it is between the first threshold value and the second threshold value, as shown in FIG. 9. In this case, for example, the distance from the center of the area 42 to the circumference of the first area 46 shown in FIG. 4B may be used as the first threshold value, and the distance from the center of the area 42 to the circumference of the second area 48 as the second threshold value. Thus, it is possible to more flexibly generate an interpolation frame.

The interpolation frame to be employed when the magnitude of the difference vector is greater than the predetermined threshold value is not limited to a synthetic frame between a motion-compensated interpolation frame and an arithmetic mean interpolation frame, but may be any frame as long as it is less dependent on the motion vector than a motion-compensated interpolation frame. For example, an arithmetic mean interpolation frame itself, or a first frame or a second frame itself may be used as an interpolation frame. For the latter case, the arithmetic mean interpolation image generation section 307 shown in FIG. 2 may be optional.

While the embodiment described above is directed to an example where the magnitude of the difference vector is compared with a predetermined threshold value and the method of generating the interpolation frame is varied depending on the comparison result, the provision of the predetermined threshold value is not indispensable, as long as an appropriate interpolation frame is generated through a process performed based on the magnitude of the difference vector. For example, the ratio of synthesis a may be varied in inverse proportion to the magnitude of the difference vector.

While the motion vector and the difference vector are calculated by the unit of macroblocks in the embodiment described above, the present disclosure is not limited to such an example. For example, an average of motion vectors and an average of difference vectors may be calculated for each area including a plurality of macroblocks, and the process described above may be performed for each area. By performing the process for each area, it is possible to suppress the amount of computation. In the present specification, the term "block" refers not only to a macroblock of Embodiment 1, but also to an area including a plurality of macroblocks.

Moreover, while the motion vector calculation section 302 of Embodiment 1 calculates the motion vector by searching for a match more finely in areas around the area corresponding to the preceding motion vector, as shown in FIG. 4B, the present disclosure is not limited to such an example. For example, where the pattern of motion of an object can be predicted in advance, it is possible to appropriately set a searching method based on the predicted motion. The searching precision may be set to be constant irrespective of the degree of change from the preceding motion vector.

The embodiment above is directed to an example where the technique of the present disclosure is applied to the digital video camera 100 (image capturing apparatus). However, the application of the technique of the present disclosure is not limited to the image capturing apparatus, but the technique is also applicable to an image processing apparatus capable of serving as the image processing section 160 described above, for example. The configuration of such an image processing apparatus is similar to that shown in FIG. 2, for example, and the operation thereof is similar to that shown in FIG. 3, for example. For example, the image processing apparatus can obtain data of a moving picture that has been generated by a video camera and stored in a storage medium, or data of a moving picture transmitted via telecommunications network, at a later point in time, and insert an interpolation frame through the process described above to store the resultant data as another piece of moving picture data.

The technique of the present disclosure may be further applicable to software (program) that defines the interpolation frame generating process described above. The operation defined by such a program is as shown in FIG. 3, for example. Such a program may be provided while being stored in a portable storage medium, or may be provided through a telecommunications network. With a processor provided in a computer executing such a program, it is possible to realize the various operations described in the embodiment above.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The application of the technique of the present disclosure is not limited to the digital video camera 100. That is, the present disclosure is applicable to image processing apparatuses capable of converting the frame rate, such as digital still cameras, information terminals equipped with cameras, personal computers, and server computers.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-002739 filed Jan. 11, 2012, and No. 2013-000805 filed Jan. 8, 2013 the entire contents of which are hereby incorporated by reference.

What is claimed is:

1. An image processing apparatus for generating an interpolation frame to be inserted between two frames of a moving picture contiguous with each other, the image processing apparatus comprising:
    a motion vector calculation section configured to calculate a first motion vector by performing a matching operation between first and second frames, of a first frame, a second frame and a third frame of the moving picture contiguous with one another, and calculate a second motion vector by performing a matching operation between the second and third frames; and
    an interpolation frame generation section configured to generate an interpolation frame to be inserted between the second frame and the third frame through a process performed based on a magnitude of a difference vector between the first motion vector and the second motion vector,
    wherein the interpolation frame generation section:
        generates, as the interpolation frame, a frame representing a transitional state between the second and third frames obtained based on the second motion vector when the magnitude of the difference vector is less than or equal to a predetermined threshold value; and
        generates, as the interpolation frame, a frame obtained through a process including an arithmetic mean between the second and third frames when the magnitude of the difference vector is greater than the threshold value.

2. The image processing apparatus of claim 1, wherein the interpolation frame generation section is configured to generate, as the interpolation frame, a synthetic frame between a frame representing the transitional state and a frame obtained by an arithmetic mean between the second and third frames if the magnitude of the difference vector is greater than the threshold value.

3. The image processing apparatus of claim 2, wherein the interpolation frame generation section is configured to generate the synthetic frame by synthesizing together a frame representing the transitional state and a frame obtained by an arithmetic mean between the second and third frames at a different ratio depending on the magnitude of the difference vector.

4. The image processing apparatus of claim 1, wherein:
the motion vector calculation section is configured to divide the first frame into a plurality of blocks to calculate the first motion vector by searching for a match in a corresponding area in the second frame for each of the divided blocks, and divide the second frame into a plurality of blocks to calculate the second motion vector by searching for a match in a corresponding area in the third frame for each of the divided blocks; and
the interpolation frame generation section is configured to generate the interpolation frame based on the second motion vector calculated for each block in the second frame.

5. The image processing apparatus of claim 4, wherein when searching for a match in an area in the third frame corresponding to a block in the second frame to calculate the second motion vector, the motion vector calculation section searches for a match more finely in an area that is within a first distance from a point in the block that is indicated by the first motion vector than in an area that is within a second distance therefrom, the second distance being longer than the first distance.

6. An image capturing apparatus comprising:
the image processing apparatus of claim 1; and
an image capturing section configured to generate data of the moving picture including the first to third frames by an image capturing operation.

7. A computer program, stored on a non-transitory computer-readable medium, to be executed by a computer mounted in an image processing apparatus for generating an interpolation frame to be inserted between two frames, contiguous with each other, of a moving picture obtained by an image capturing apparatus, the computer program instructing the computer to execute the steps of:
calculating a first motion vector by performing a matching operation between first and second frames, of a first frame, a second frame and a third frame of the moving picture contiguous with one another, and calculating a second motion vector by performing a matching operation between the second and third frames; and
generating an interpolation frame to be inserted between the second frame and the third frame through a process performed based on a magnitude of a difference vector between the first motion vector and the second motion vector,
wherein the generating the interpolation frame includes:
generating, as the interpolation frame, a frame representing a transitional state between the second and third frames obtained based on the second motion vector when the magnitude of the difference vector is less than or equal to a predetermined threshold value; and
generating, as the interpolation frame, a frame obtained through a process including an arithmetic mean between the second and third frames when the magnitude of the difference vector is greater than the threshold value.

* * * * *